April 24, 1962 C. THUMIM 3,031,054
AUTOMATIC INDEXING BAR
Filed Sept. 15, 1958 4 Sheets-Sheet 1

INVENTOR.
CARL THUMIM
BY
ATTORNEYS

April 24, 1962
C. THUMIM
3,031,054
AUTOMATIC INDEXING BAR
Filed Sept. 15, 1958
4 Sheets-Sheet 2
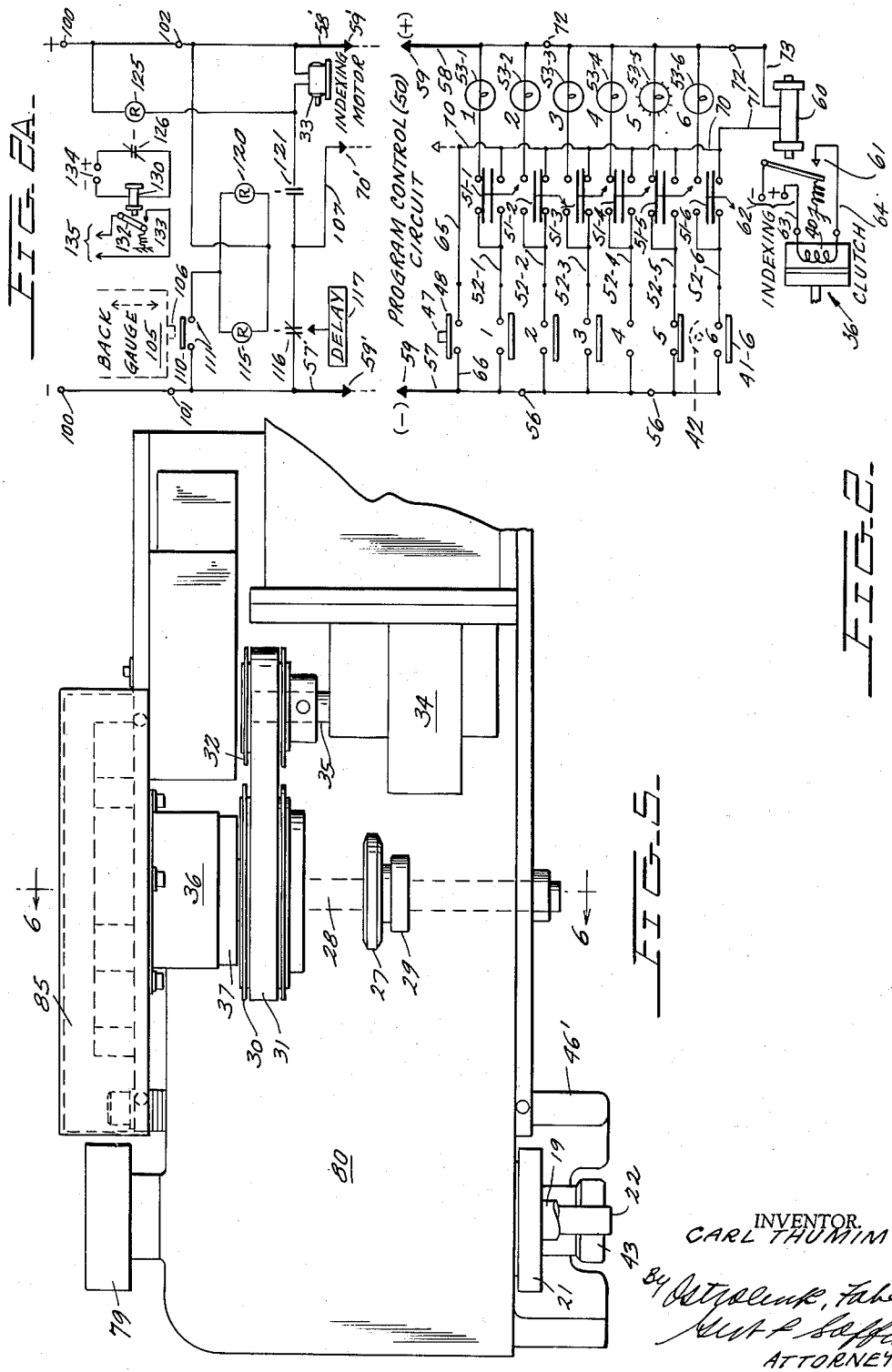

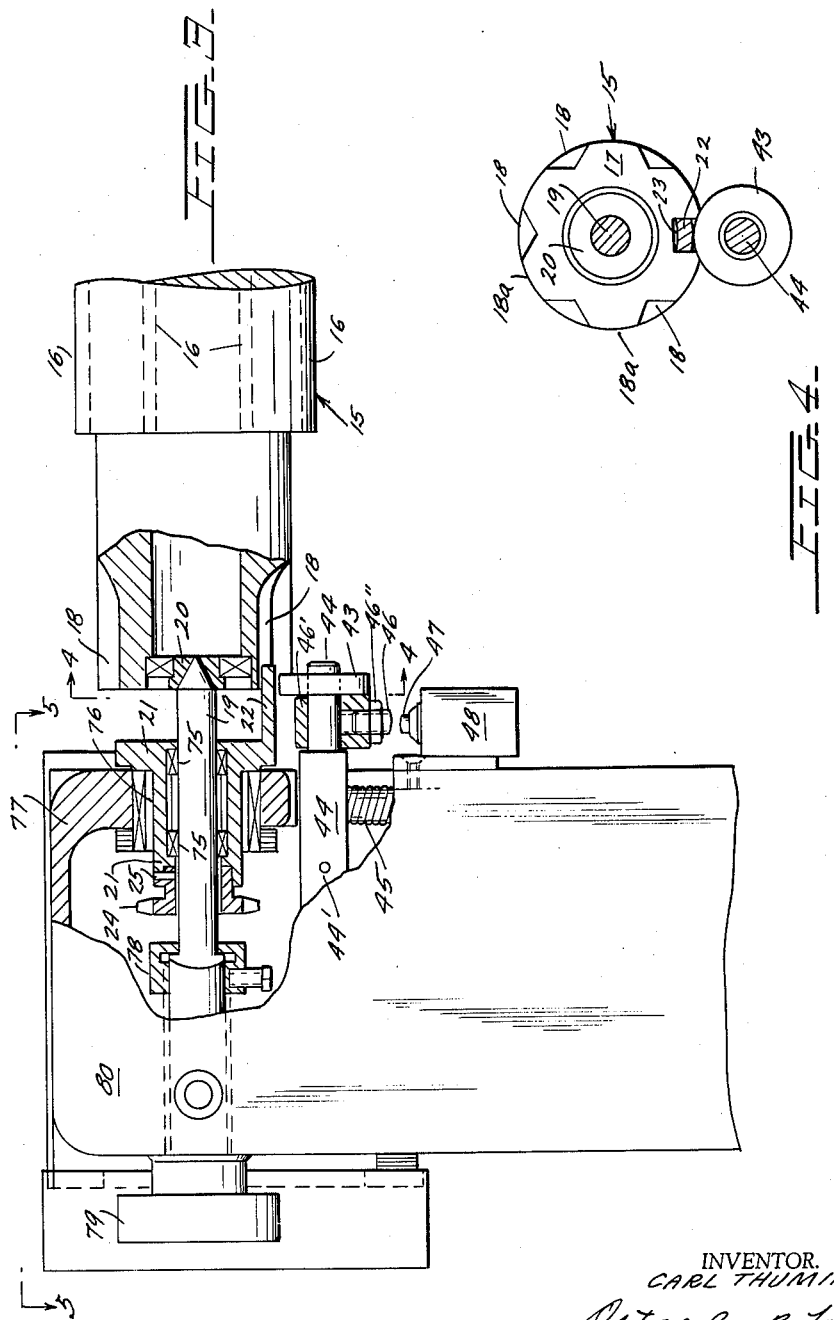

April 24, 1962 C. THUMIM 3,031,054
AUTOMATIC INDEXING BAR
Filed Sept. 15, 1958 4 Sheets-Sheet 4
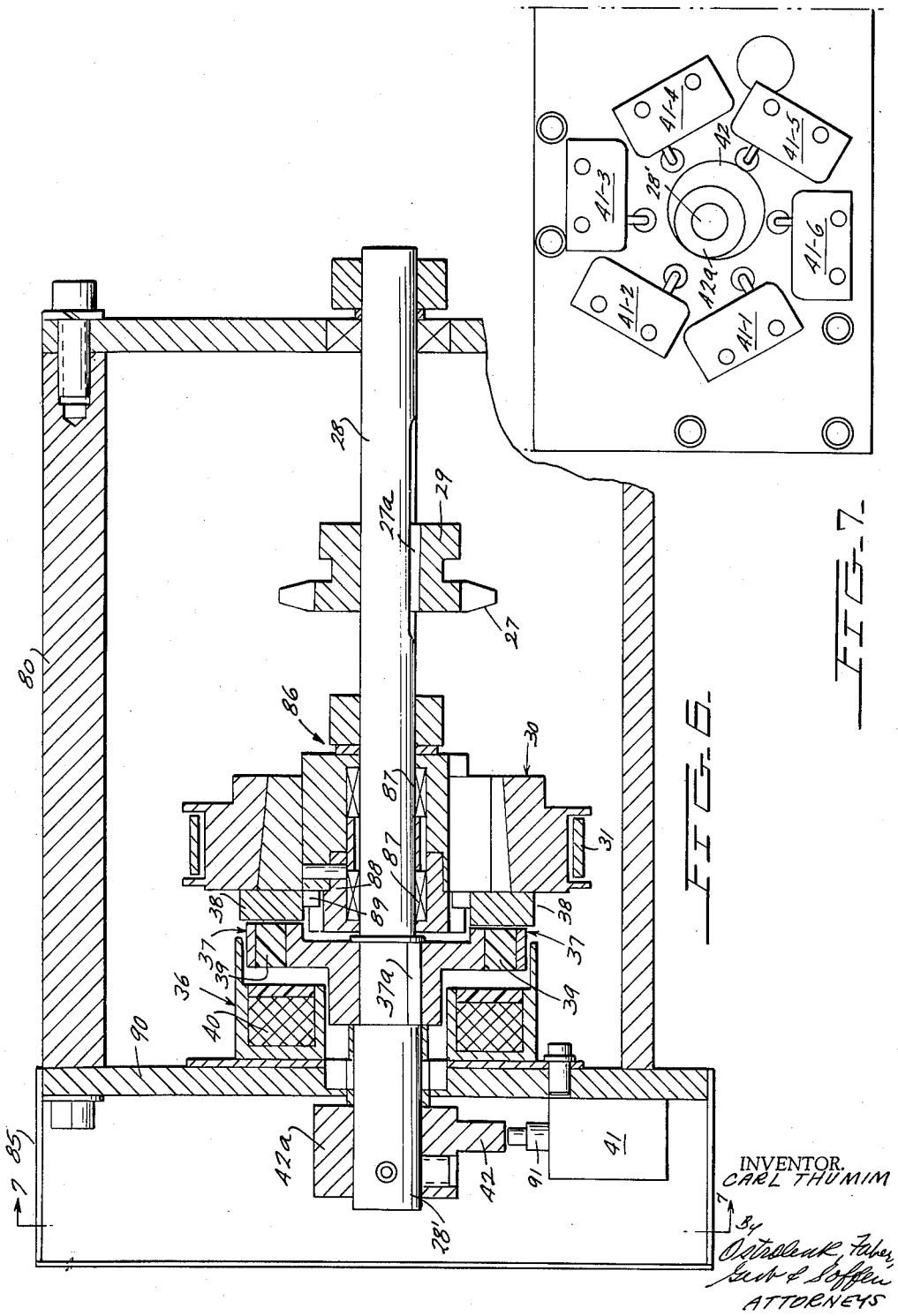
INVENTOR.
CARL THUMIM United States Patent Office 3,031,054
Patented Apr. 24, 1962

3,031,054
AUTOMATIC INDEXING BAR
Carl Thumim, Westbury, N.Y., assignor to The Lawson Company Division of Miehle-Goss-Dexter, Inc., New York, N.Y., a corporation of New York
Filed Sept. 15, 1958, Ser. No. 761,039
6 Claims. (Cl. 192—142)

This invention relates generally to programming systems for paper cutting machines, and more particularly relates to novel automatic indexing controls for program bars of cutting machines.

The features of my present invention are applicable to diverse programmed cutting machines and apparatus. Reference is made to Patent No. 2,737,158, assigned to the assignee of this case, for a typical paper stack cutting machine with a multi-program bar that is automatically controllable by my invention system hereof.

The program bar is provided with a detent designating each program position thereon. An individual switch is actuated for each detent when it becomes positioned at the program control point, wherein its associated program is effective on the machine. A series of program control switches are arranged with these switches in a manner to effect a predetermined sequence of movement of the program bar. An electromagnetic clutch is energized by the switch circuitry to motivate the program bar to the desired sequential program positions. A detent sensing switch in circuit therewith ensures movement of the bar between the program positions.

A primary object of the present invention is to provide a novel system for controlling the angular positioning of a program bar.

Another object of the present invention is to provide a novel circuit for effecting positive yet simple control arrangements for positioning a program bar.

A further object of the present invention is to provide novel drive mechanisms incorporating an electromagnetic clutch, and control circuitry therefor, to angularly position a program bar.

Still another object of the present invention is to provide a novel program bar control system, with a detent for each program position and a switch for each detent associated with corresponding control setting switches.

Still a further object of the present invention is to provide a novel system for controlling the position of a program bar that is simple to operate, and fool-proof.

These and further objects of the present invention will be more evident from the following description of an exemplary embodiment thereof, illustrated in the drawings, in which:

FIGURE 2 is a schematic diagram of the pre-set control circuit of the system of FIGURE 1.

FIG. 2A is an electric schematic of the indexing power circuitry.

FIGURE 3 is an elevational view, partly cut-away, of the physical embodiment of the machine incorporating the invention system.

FIGURE 4 is a cross-sectional view taken along the line 4—4 of FIGURE 3, showing the program bar in end view.

FIGURE 5 is a top view of the machine of FIGURE 3, as viewed along the line 5—5 thereof, partially broken away.

FIGURE 6 is a transverse cross-sectional view through FIGURE 5, taken along the line 6—6 thereof.

FIGURE 7 is an end view of the program switch arrangement, as seen along the line 7—7 in FIGURE 6.

Figure 1:
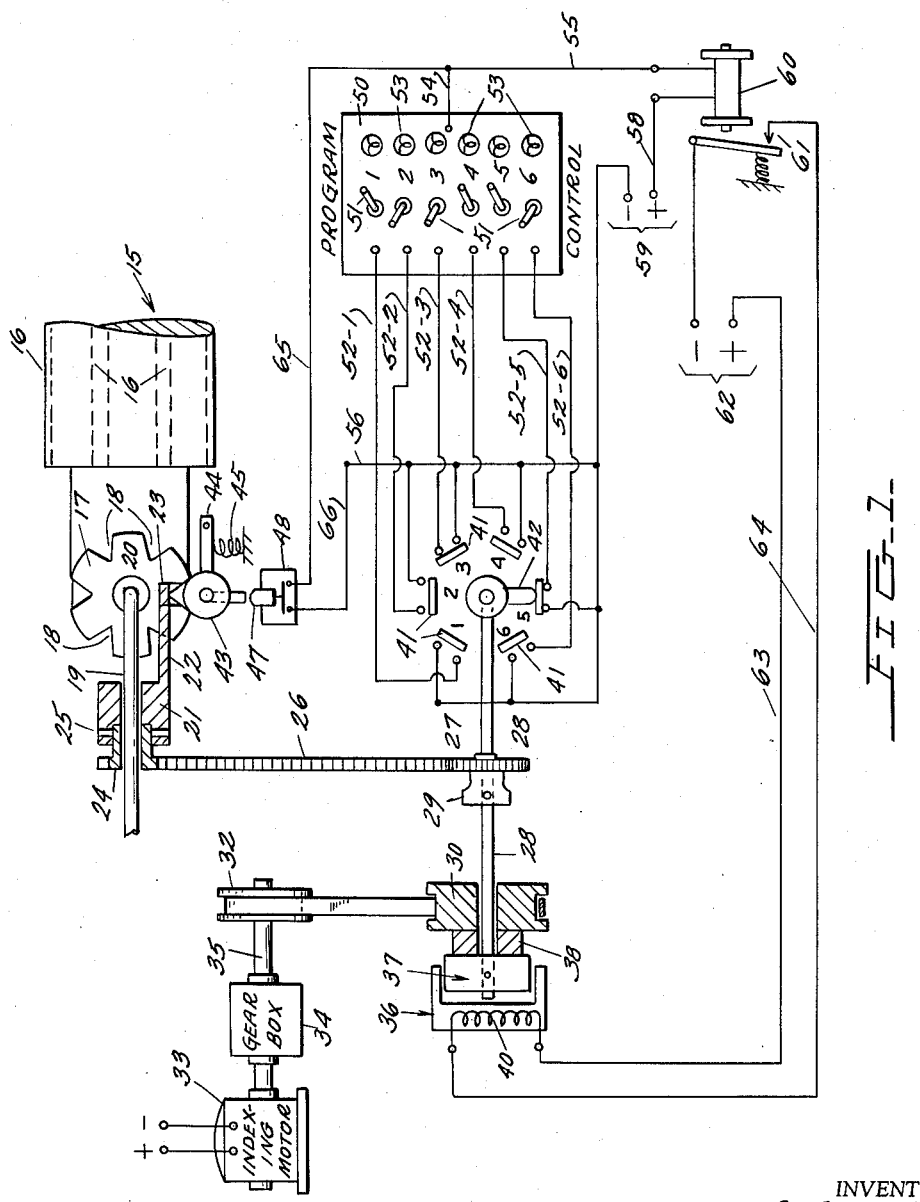
FIGURE 1 is a diagrammatic illustration of the exemplary program bar control system.

The exemplary system is shown in diagram form in FIGURE 1. The program bar 15 is diagrammatically indicated, as it may take various specific forms. The dotted sections 16, 16 indicate the individual program tracks thereof, corresponding to the back-gauge start-stop control of the aforesaid patent. Bar 15 has six control tracks 16, 16, and is referred to as the hexagonal program bar. The end or mounting portion 17 of bar 15 contains six detents 18, 18 at angular positions corresponding to those of the associated program tracks 16, 16. The program bar 15 is rotatably supported by an adjustable stationary center 19 at its detent end 17, in central opening 20.

A drive collar 21 rotates about center rod 19, and has a dog 22 extending to engage a slot 23 in bar end 17. A sprocket wheel 24 is secured at 25 with collar 21. Rotation of sprocket chain 26 accordingly drives sprocket 24, collar 21, dog 22 and program bar 15. Sprocket chain 26 is controllably driven by sprocket wheel 27. Sprocket wheel 27 has the same diameter as sprocket wheel 24 so that counter-shaft 28 rotates in unison with bar 15. Sprocket wheel 27 is secured with counter-shaft 28 at its hub 29. A free-running pulley 30 rotates about counter-shaft 28. Pulley 30 is continuously driven by belt 31 coupled to be driven by pulley 32. Motor 33 operates drive pulley 32 through reduction gear box 34 and shaft 35. A practical speed for counter-shaft 28 is 10 r.p.m.

The rotating pulley 30 is controllably coupled to drive counter-shaft 28 through diagrammatically indicated electromagnetic clutch 36. Clutch member 37 is axially displaceable along counter-shaft 28 and coupled to drive counter-shaft 28. Further, clutch member 37 is engageable with element 38 coupled with pulley 30. The clutch 36 is electrically actuated by energization of its coil 40 to cause counter-shaft 28 to be driven by free-running pulley 30, in a well-known manner. Accordingly, energization of clutch coil 40 causes counter-shaft 28 to be directly driven by pulley 30, to drive sprocket wheel 27 to turn dog 22 and rotate the program bar 15. Upon de-energization of clutch coil 40, program bar 15 remains stationary.

There is provided a SPST switch 41 for each detent 18 position. Thus six switches 41 are arranged in a circular path (1 to 6) about a cam 42 secured at an end of counter-shaft 28. Cam 42 is shown in the No. 5 position, causing the closure of contacts of its associated switch 41. Switch 41 is normally electrically open. Cam 42 rotates in synchronism with program bar 15 and closes the corresponding switch 41 when its program track 16 is in proper control position in the machine. Such control positions are synchronous also with the corresponding coaction of the associated detent 18 with roller 43. Roller 43 is spring biased against the periphery of detent section 17 through lever 44 and spring 45.

A pin 46 extends from the roller 43 assembly that is pressed against button 47 of normally open SPST switch 48 when roller 43 is outside of the detent 18. Thus, when the program bar 15 is not in a program (1 to 6) position, the periphery of detent section 17 engages roller 43 to keep switch 48 electrically closed. When a detent (18) or program (16) position is reached, roller 43 falls into a detent 18 to open switch 48. Switch 48 thus serves as a detent or program-position sensing switch.

The operator pre-set program control unit 50 is provided with a program switch 51 individual for each program track or channel 16 on program bar 15. Switches 51 are DPDT switches circuitally arranged with the corresponding program switches 41 to effect the drive control and positioning of program bar 15. A contact of each program switch 41 is connected by respective leads 52–1 to 52–6 to control unit 50. When a control switch 51 is set at the left, as are the switches for programs 2, 3 and 6 shown, closure of the corresponding switch 41 by cam 42 will cause clutch coil 40 to be energized and bar 15 continues its movement, unimpeded.

When the program switch 41 corresponding to a control switch moved to the right (as those for 1, 4 and 5), is closed by cam 42, no energization results in coil 40 and the bar 15 rests at such selected position. The corresponding pilot light 53 (as at position 5 of FIGURE 1) lights up when the program bar reaches and reposes at that position. FIGURE 2 is a circuit diagram of the inter-connections of the switching system hereof. The common output lead 54 from control unit 50 connects to relay 60 through lead 55. The program switches 41 each has one contact connected in common to lead 56, which in turn connects to solenoid 60 through switch 48, lead 65, lead 55 in series with an energy source 59 via lead 57. Energization of relay 60, in the aforesaid manner, closes relay contact 61, completing the clutch coil 40 circuit with energy source 62 through leads 63, 64.

Circuit details of program control unit 50 are shown in FIGURE 2. The right contacts of program switches 41–1 to 41–6 are connected respectively to both left contacts of control switches 51–1 to 51–6 through leads 52–1 to 52–6. The left contacts of switches 41 are interconnected to common lead 56, connected to the negative power terminal of supply 59 through lead 57, as in FIGURE 1. The lower-right contacts of DPDT switches 51–1 to 51–6 are all inter-connected to common lead 70, and in turn to relay 60 through lead 71. The upper-right contacts of the control switches 51–1 to 51–6 are individually connected to a terminal of respective pilot lamps 53–1 to 53–6. The other (right) terminal of each lamp 53 is interconnected with a lead 72, corresponding to the common lead 54 of FIG. 1, and in turn to the positive source terminal through lead 58. Relay 60 also is connected to the positive source lead 72 through connection 73, corresponding to lead 55 of FIG. 1.

Actuation of a switch 51 to the left, in FIGURE 2, interconnects the lower contacts thereof, as shown at 51–2, 51–3 and 51–6. Actuation of a switch 51 to the right interconnects the upper contacts; as shown at 51–1, 51–4 and 51–5. Actuation to the right is into the control position to effect stoppage, in sequence, of the program bar 15 in the corresponding program channel. Thus, when the program switch 41–5 is "closed" by cam 42, as previously outlined, the circuit to clutch relay 60 is "opened" by the right throw of control switch 51–5, as the lower contacts thereof remain unconnected for completion of the relay 60 energization. Instead, the upper switch 51–5 contacts are "closed" to complete the circuit for energizing the associated pilot lamp 53–5.

Thus, in the above example, the program bar 15 remains at the channel 5 position since the control switch 51–5 "opened" the clutch coil 40 circuit through relay 60. The number 5 pilot lamp is lit-up to signify the positioning of the program bar (15) in its number 5 position. When the cutting cycle on the paper stack is completed, under the control of the fifth program, the operator motivates the program bar 15 to the next sequential position by simply turning the fifth control switch 51–5 to the left for "off." This pilot lamp 53–5 thereupon goes out, and the next program set-up, namely the number 1 channel (of FIGURES 1 and 2) is motivated into operative position.

The sequential operation of FIGURE 2 hereof is semi-automatic, as it is necessary to manually actuate the then present channel (5) switch 51–5 to "off" to the left to complete the clutch coil 40 energization through the lower contacts of switch 51–5 and relay 60. When program 6 causes cam 42 to close switch 41–6, the already closed lower contacts of control switch 51–6 continues the clutch energization to motivate the program bar 15 further. The detent 17 peripheral closure of roller 43 against switch 48 by-passes the switches 41 and 51 through leads 65, 66 to keep relay 60 energized until the next detent is reached, namely that for channel 1. As the corresponding control switch 51–1 is to the right and its lower contacts "open," the program bar 15 remains thereat, and the number 1 pilot 53–1 lights up. In a similar manner, any sequential operation of the programs for program bar 15 is effectuated for this semi-automatic mode.

The semi-automatic program control circuitry of FIGURE 2 is readily extended to be fully automatic further in accordance with my invention herein. Towards this end, the control circuit 50 of FIGURE 2 is extended to include the machine automatic override circuit of FIGURE 2A. Terminals 59', 59' are thereupon connected with terminals 59, 59; and terminal 70' to line 70, of FIGURE 2. Lines 57' and 58' are thereby respectfully connected to lines 57 and 28. In such case the power supply 100, 100 can be available for the control circuit 50 as well, through leads 101, 102.

The automatic spacer or back gauge schematically indicated at 105, operates in the conventional manner to controllably push paper stacks for the cutting, such as shown in the copending patent application referred to hereinabove. A projection 106 of back gauge 105 abuts reverse limit switch 110 when it is at the end of its program cycle. The contacts 111 of limit switch 110 are in series between lines 101, 102 and the coils of two relays 115 and 120 in parallel. Relay 115 has normally closed contacts 116; relay 120, normally open contacts 121. Contact sets 116 and 121 are in series connection between power lines 57', 58' and the indexing motor 33 (see FIGURE 1). A lead 107 connects between the contacts 116, 121 and terminal 70' connecting to lead 70 of FIGURE 2.

When back gauge 105 reaches the rear, the reverse limit switch 110 closes contacts 111 and the coils of relays 115 and 120 are energized. The normally closed contacts 116 have a time delay member 117 whereby their opening is predeterminedly delayed. Thus, the indexing motor 33 is directly energized upon the end of the back gauge 105 cycle. Also, through leads 107 and 70, relay 60 is directly energized and the clutch coil 40 energized to start motivation of program bar 15 as hereinabove set forth. The delay 117 is timed for bar 15 to turn sufficiently for the index 18 to pass roller 43 (FIGURE 1), and cause sensing switch 48 to close.

Indexing motor 33 is thus maintained energized through the closed contacts of switch 48 and closed contacts 121 of energized relay 120. Program bar 15 is thereupon rotated until its next successive index position. If the control switch 51 thereof is set for the bar 15 to stop thereat, as described above, the opening of switch 48 at this next detent 18 results in the bar 15 remaining stationary. However, if the switch 51 is set for the bar to skip over, the bar continues to turn until the next preset stopping position thereof, as will now be understood.

A third relay 125 is connected in parallel across indexing motor 33. Its coil is thereupon energized with motor 33. The contacts 126 of relay 125 are normally closed, and kept "open" while relay 125 coil is thus energized. When the program bar 15 is finally motivated to its next preset index position, detent sensing switch 48 "opens," relay 60 is unenergized, and indexing motor 33 becomes de-energized as relay contacts 116 are also "open." Relay 125 thereupon also becomes de-energized, and its contacts 126 "close." The coil of a fourth relay 130 is in circuit with contacts 126 and a source 132 of potential.

The contacts 132, 133 of relay 130 engage when relay coil 130 is energized, to close the circuit at 135. Circuit 135 is arranged to start the back gauge 105 in its forward cycle, in a well known manner. The automatic spacer or back gauge 105 thereupon executes its cycle under the control of the section 17 of program bar 15 then in position. After the forward cycle of back gauge 105, it is arranged to be motivated back to its start or "reverse" position, when it closes reverse limit switch 110 and automatically initiates the program control circuit 50 in the manner hereinabove described.

FIGURES 3 to 7 are drawings of a physical machine incorporating the invention-automatic program bar control system. The free riding sleeve 21 rotates on bearings 75, 75 and sleeve bearing 76 in frame portion 77. Sprocket wheel 24 is secured with sleeve 21 at 25 as indicated in FIGURE 1. Center post 19 is axially adjustable through coupling 78 and hand wheel 79 extending from frame 80. The detent sensing roller 43 extends from lever 44 pivoted at 44'.

The pin 46 associated with roller 43 (see FIGURE 1) extends from a housing 46' secured on lever 44. An adjustable nut 46" arrangement permits accurate locating of pin 46 for actuation of button 47 of switch 48. Spring 45 is mounted to press lever 44 to bias roller 43 towards detent 17. The end view of detent face 17 of program bar 15 is seen in FIGURE 4. Coaction of roller 43 therewith is evident, with displacement downwardly (against switch 48) when the peripheral portions 18a, 18a are encountered.

The top view, FIGURE 5, partly broken away, shows the relation of the continuous drive and clutch assembly for the bar 15 control. The indexing motor 33 is set at one end. Reduction gear box 34 connects motor 33 to shaft 35 for pulley 32. Free running driven pulley 30 rotates on countershaft 28 as shown in FIGURE 1. The clutch 36 and associated member 37 acts selectively to couple pulley 30 to countershaft 28 through armature 38 and the control circuit of the invention. The individual program detent switches (41) are housed in housing 85 at the end of frame 80. FIGURE 7 shows the internal arrangement within housing 85. FIGURE 6 is a cross-sectional view through the countershaft 28 mechanism to effect the selective motivation of the program bar (15).

As seen in FIGURE 6, sprocket wheel 27 is keyed to counter-shaft 28 by key 27a. Pulley 30 is axially adjustably mounted on sleeve assembly 86, in turn rotatably mounted on bearings 87, 87 about counter-shaft 28. A toothed extension 88 is secured to sleeve-and-pulley arrangement 30, 86. Annular clutch member 37 has teeth 89 internally, and engaged with toothed extension 88. Annular clutch member 37 is keyed at 37a to countershaft 28, and rotates therewith. Member 37 is of iron and contains a through non-magnetic ring 39. The axially displaceable armature 38 is coactable with member 37 through a magnetic circuit established in clutch 36 by coil 40 when energized. The non-magnetic ring 39 establishes the magnetic action through armature 38, as well as twice across member 37, to functionally attract members 37 and 38. This spline-toothed engagement between 88, 89 permits axial displacement therebetween while engaged. Energization of clutch coil 40 of stationary clutch 36 thus causes pulley 30 to drive countershaft 28. When no energy is impressed on coil 40 counter-shaft 28 remains stationary, wherein sprocket 27 ceases drive of sprocket 24 (FIGURES 1 and 3), and program bar 15 remains at the controlled position.

Countershaft 28 is suitably mounted in frame 80. The cam 42 is secured to end 28' extending through end plate 90. FIGURE 7 illustrates the circular disposition of the detent switches 41 about cam 42. Switches 41-1 through 41-6 are secured to end plate 90. Switches 41 each have a contactor 91 individually coactable with eccentric cam 42, to actuate switches 41-1 to 41-6 in the manner described hereinabove in connection with FIGURES 1 and 2. The program control panel 50 (FIGURE 2) is used with the switches 41 and sensing switch 48 as set forth to control clutch coil 40 and automatically position the program bar 15 in a pre-set sequential manner.

Although I have described my invention in connection with an exemplary embodiment, it is to be understood that modifications and variations thereof may be made by those skilled in the art without departing from the broader spirit and scope of the invention, as set forth in the following claims.

I claim:

1. A control system for automatically indexing a rotatable member of the character described comprising an indexed plate secured with the member and defining positions thereof, an element arranged to move in synchronism with said plate, a switch for each plate index position coactable with said element, control means associated with said plate and in circuit with said switches for motivating and establishing preset positions for the member, said control means including an electrical contactor in individual connection with each of said switches in a manner independently determining the selective stoppage of said member at succesive cyclic positions corresponding to the contactors actuated, an electromagnetic clutch in circuit relation with said switches and contactors and a free-running driven assembly engageable to drive said member upon energization of said clutch.

2. A control system for automatically indexing a rotatable member of the character described comprising an indexed plate secured with the member and defining positions thereof, an element arranged to move in synchronism with said plate, a switch for each plate index position coactable with said element, control means associated with said plate and in circuit with said switches for motivating and establishing preset positions for the member, and switch means for sensing the locating of said member at each of the indexed positions and in circuit with said control means to insure the motivation of said member when said element is between said switches.

3. A control system for automatically indexing a rotatable member of the character described comprising an indexed plate secured with the member and defining positions thereof, an element arranged to move in synchronism with said plate, a switch for each plate index position coactable with said element, control means associated with said plate and in circuit with said switches for motivating and establishing preset positions for the member, further including a pilot lamp in circuit with each of said switches, and circuit means for selectively energizing a pilot lamp only upon the member reaching a preset position corresponding thereto.

4. A control system for automatically indexing a bar containing multiple programs for a machine member, comprising an indexed detent plate secured with the bar and defining program positions thereof, an element arranged to move in synchronism with said plate, a switch for each plate detent position coactable with said element, an indexing motor control means coactable with said motor and associated with said plate and in circuit with said switches for motivating and establishing selected program positions for the bar, a reverse limit switch actuated by said machine member upon its reaching the end of each program cycle, and time-delay relay means in circuit with said reverse limit switch and said motor to initiate the motivation of said control means for the next successive selected program.

5. A control system as claimed in claim 4, including switch means for sensing the locating of said bar at the detented positions and in circuit with said control means for overriding the action of said switches and insure the motivation of said bar when said element is between said switches, said relay means having its time delay action coextensive with the dwell of said switch means at a detent position to insure progress of the motivation to said next program.

6. A control system as claimed in claim 4, further including circuit means responsive to the completion of the program bar motivation to said next selected program for releasing said machine member into the program cycle.

References Cited in the file of this patent
UNITED STATES PATENTS

| | | |
|---|---|---|
| 2,085,442 | Newell | June 29, 1937 |
| 2,102,070 | Harris | Dec. 14, 1937 |
| 2,413,211 | Brian | Dec. 24, 1946 |
| 2,702,609 | Frazier | Feb. 22, 1955 |
| 2,736,413 | Bieber | Feb. 28, 1956 |
| 2,742,599 | Schweighofer | Apr. 17, 1956 |